(12) United States Patent
Hancock et al.

(10) Patent No.: US 12,465,423 B2
(45) Date of Patent: Nov. 11, 2025

(54) ELECTROSURGICAL GENERATOR FOR DELIVERING MICROWAVE ENERGY AT MULTIPLE FREQUENCIES

(71) Applicant: Creo Medical Limited, Chepstow (GB)

(72) Inventors: Christopher Paul Hancock, Chepstow (GB); Malcolm White, Chepstow (GB)

(73) Assignee: Creo Medical Limited, Chepstow (GB)

( * ) Notice: Subject to any disclaimer, the term of this patent is extended or adjusted under 35 U.S.C. 154(b) by 753 days.

(21) Appl. No.: 17/790,099

(22) PCT Filed: Dec. 21, 2020

(86) PCT No.: PCT/EP2020/087526
§ 371 (c)(1),
(2) Date: Jun. 29, 2022

(87) PCT Pub. No.: WO2021/136717
PCT Pub. Date: Jul. 8, 2021

(65) Prior Publication Data
US 2023/0057974 A1 Feb. 23, 2023

(30) Foreign Application Priority Data
Dec. 30, 2019 (GB) ...................... 1919435

(51) Int. Cl.
*A61B 18/18* (2006.01)
*A61B 18/00* (2006.01)

(52) U.S. Cl.
CPC ............. *A61B 18/1815* (2013.01); *A61B 2018/00172* (2013.01); *A61B 2018/1823* (2013.01); *A61B 2018/1876* (2013.01)

(58) Field of Classification Search
CPC .. A61B 2018/00172; A61B 2018/1823; A61B 2018/1876; A61B 18/18; A61B 18/1815
See application file for complete search history.

(56) References Cited

U.S. PATENT DOCUMENTS

| | | | |
|---|---|---|---|
| 2010/0286686 A1* | 11/2010 | Hancock | A61B 18/1815 606/167 |
| 2011/0125148 A1 | 5/2011 | Turner et al. | |
| 2016/0374752 A1* | 12/2016 | Hancock | A61B 18/1815 606/33 |

FOREIGN PATENT DOCUMENTS

| | | |
|---|---|---|
| CN | 101 868 189 A | 10/2010 |
| CN | 104 812 323 A | 7/2015 |

(Continued)

OTHER PUBLICATIONS

Chinese Office Action dated Jul. 19, 2024, in connection with Chinese Application No. CN 22080090758.2, with English translation thereof.

(Continued)

*Primary Examiner* — Linda C Dvorak
*Assistant Examiner* — Bradford C. Blaise
(74) *Attorney, Agent, or Firm* — Wolf, Greenfield & Sacks, P.C.

(57) ABSTRACT

The invention relates to an electrosurgical system for delivering electromagnetic energy at a plurality of frequencies to cause different effects on biological tissue at a treatment site, and in particular to an electrosurgical generator. The electrosurgical generator comprises an electromagnetic signal supply unit for generating microwave energy to be conveyed on each of a plurality of microwave channels, wherein each of the plurality of microwave channels is arranged to convey microwave energy at a different frequency; an output port configured to be connectable to a probe for delivering microwave energy from the plurality of microwave channels; and a signal combiner configured to connect the plurality of microwave channels to the output port, wherein the signal combiner comprises a band stop filter module disposed at a distal end of each of the plurality of microwave channels, wherein the band stop filter module for each (Continued)

microwave channel is configured to block microwave energy at the frequency conveyed on the other microwave channels; and a common signal pathway extending between the output port and a junction at which the plurality of microwave channels are connected.

13 Claims, 10 Drawing Sheets

(56) References Cited

FOREIGN PATENT DOCUMENTS

| CN | 105 84 8604 A | 8/2016 |
|----|---------------|--------|
| CN | 107 550 560 A | 1/2018 |
| CN | 110 167 474 A | 8/2019 |
| GB | 2559595 A | 8/2018 |
| GB | 2560973 A | 10/2018 |
| GB | 2569811 A | 7/2019 |
| WO | WO 2009/040523 A2 | 4/2009 |
| WO | WO 2015/087051 A1 | 6/2015 |

OTHER PUBLICATIONS

Search Report dated Jun. 23, 2020 in connection with GB Application No. 1919435.6.

International Search Report and Written Opinion mailed Apr. 8, 2021 in connection with International Application No. PCT/EP2020/087526.

Written Opinion of the International Preliminary Examining Authority mailed Jul. 16, 2021 in connection with International Application No. PCT/EP2020/087526.

International Preliminary Report on Patentability Chapter II mailed Apr. 12, 2022 in connection with International Application No. PCT/EP2020/087526.

* cited by examiner

ELECTROSURGICAL GENERATOR FOR DELIVERING MICROWAVE ENERGY AT MULTIPLE FREQUENCIES

CROSS REFERENCE TO RELATED APPLICATIONS

This Application is a national stage filing under 35 U.S.C. § 371 of International Patent Application Serial No. PCT/EP2020/087526, filed on Dec. 21, 2020, which claims priority to British application number 1919435.6, filed Dec. 30, 2019. The entire contents of these applications are incorporated herein by reference in their entirety.

FIELD OF THE INVENTION

The invention relates to an electrosurgical system for delivering electromagnetic energy at a plurality of frequencies to cause different effects on biological tissue at a treatment site. In particular, the invention relates to an electrosurgical generator for selectively supplying energy at a plurality of microwave frequencies along a common feed cable, which may be capable of being introduced through an instrument channel of a surgical scoping device (e.g. endoscope or bronchoscope) to treat biological tissue in a minimally invasive manner.

BACKGROUND TO THE INVENTION

Electrosurgical generators are pervasive throughout hospital operating theatres, for use in open and laparoscopic procedures, and are also increasingly present in endoscopy suites. In endoscopic procedures the electrosurgical accessory is typically inserted through a lumen inside an endoscope. Considered against the equivalent access channel for laparoscopic surgery, such a lumen is comparatively narrow in bore and greater in length.

It is known to use radiofrequency (RF) energy to cut biological tissue. The method of cutting using RF energy operates using the principle that as an electric current passes through a tissue matrix (aided by the ionic contents of the cells and the intercellular electrolytes), the impedance to the flow of electrons across the tissue generates heat. When an RF voltage is applied to the tissue matrix, enough heat is generated within the cells to vaporise the water content of the tissue. As a result of this increasing desiccation, particularly adjacent to the RF emitting region of the instrument (referred to herein as an RF blade) which has the highest current density of the entire current path through tissue, the tissue adjacent to the cut pole of the RF blade loses direct contact with the blade. The applied voltage then appears almost entirely across this void which ionises as a result, forming a plasma, which has a very high volume resistivity compared to tissue. This differentiation is important as it focusses the applied energy to the plasma that completed the electrical circuit between the cut pole of the RF blade and the tissue. Any volatile material entering the plasma slowly enough is vaporised and the perception is therefore of a tissue dissecting plasma.

GB 2 486 343 discloses a control system for an electrosurgical apparatus which delivers both RF and microwave energy to treat biological tissue. The energy delivery profile of both RF energy and microwave energy delivered to a probe is set based on sampled voltage and current information of RF energy conveyed to the probe and sampled forward and reflected power information for the microwave energy conveyed to and from the probe.

GB 2 522 533 discloses an isolating circuit for an electrosurgical generator arranged to produce radiofrequency (RF) energy and microwave energy for treating biological tissue. The isolating circuit comprises a tunable waveguide isolator at a junction between the microwave channel and signal combiner, and can include a capacitive structure between a ground conductor of the signal combiner and a conductive input section of the waveguide isolator to inhibit coupling of the RF energy and leakage of the microwave energy.

SUMMARY OF THE INVENTION

At its most general, the present invention proposes an electrosurgical generator capable of selective delivery of microwave energy at a plurality of different frequencies. The different frequencies may be delivered separately or simultaneously, e.g. to create different effects or biological tissue. To enable efficient delivery of the microwave energy, the electrosurgical generator has a signal combiner capable of effective isolation of a plurality of microwave channels, so that each frequency of energy is directed from its respective channel to an output port with minimal or negligible leakage into channels conveying other frequencies.

According to an aspect of the invention, there is provided an electrosurgical generator comprising: an electromagnetic signal supply unit for generating microwave energy to be conveyed on each of a plurality of microwave channels, wherein each of the plurality of microwave channels is arranged to convey microwave energy at a different frequency; an output port configured to be connectable to a probe for delivering microwave energy from the plurality of microwave channels; and a signal combiner configured to connect the plurality of microwave channels to the output port, wherein the signal combiner comprises: a band stop filter module disposed at a distal end of each of the plurality of microwave channels, wherein the band stop filter module for each microwave channel is configured to block microwave energy at the frequency conveyed on the other microwave channels; and a common signal pathway extending between the output port and a junction at which the plurality of microwave channels are connected.

The electrosurgical generator thus produces a plurality of microwave signals, each signal being delivered on a separate channel and having a different frequency from the other signals. The signal combiner has a plurality of band stop filter modules, one module for each of the microwave channel. Each module is adapted for its respective channel by being capable of blocking microwave energy at the (different) frequencies conveyed on the other channel. So, in a three channel scenario, the module on a first channel blocks frequencies of second and third channels, while the module on the second blocks frequencies on the first and third channel, and so on. The modules can be configured for any number of channels.

The electromagnetic signal supply unit may comprise a plurality of microwave sources each configured to output microwave energy at one of the frequencies conveyed by the plurality of microwave channels. That is, each of the microwave channels may be independent from the others. Alternatively, microwave signals at different frequencies may be derived from a common source and then delivered to their respective microwave channel.

There may be three or more microwave channels, so that the generator is capable of delivering microwave energy at any one or any combination of three or more microwave frequencies. For example, the plurality of microwave channels may be configured to output microwave energy having any combination of two or more of 433 MHz, 915 MHz, 2.45 GHz, 5.8 GHz, 14.5 GHz, 24 GHz, 60 GHz.

Each microwave channel may comprise a trunk transmission line along which microwave energy having the frequency corresponding to that microwave channel is conveyed from the electromagnetic signal supply unit to the junction. The trunk transmission line may take any suitable form, e.g. coaxial transmission, microstrip, waveguide, etc. A coaxial transmission line may be preferred to minimise losses.

Each band stop filter module may comprise a three stub filter for each frequency of microwave energy to be blocked. Thus, each module may comprise a plurality of three stub filters, one for each frequency to be blocked. In a three channel scenario, each module will have two three stub filters. In an n-channel scenario, each module will have (n−1) three stub filters. Each three stub filter may comprise three stubs (i.e. three lengths of transmission line) connected to the trunk transmission line and extending away therefrom (e.g. orthogonal thereto). Each stub may be configured to present an open circuit in shunt to the junction at a wavelength of the microwave energy to be blocked.

In one configuration, the open circuit condition is achieved by each of the three stubs having a length equal to a quarter wavelength of the microwave energy to be blocked, and the three stubs being separated along the trunk transmission line by half a wavelength of the microwave energy to be blocked, and the first stub being spaced from the junction by a distance equal to an odd number of quarter wavelengths of the microwave energy to be blocked.

The stubs may be formed from piece of the same type of transmission line as the trunk transmission line. For example, they may be lengths of coaxial transmission line, microstrip transmission line, or waveguide. In one example, the band stop filter modules may be configured as a stripline component.

The trunk transmission line may be of the same type throughout the microwave channel, including in the band stop filter module. However, in some examples, the trunk transmission line for each microwave channel may comprise a different type of transmission line in the band stop filter module. For example, each microwave channel may comprise a coaxial transmission line portion extending from the electromagnetic signal supply unit to the band stop filter module, and a filter portion extending through the band stop filter portion. The filter portion may be a microstrip or stripline transmission line. The band stop filter module may comprise an SMA connector for connecting the coaxial transmission line portion to the filter portion. There may be a second SMA connector for connecting a distal end of the filter portion to the output port. The junction of the microwave channels may be a junction of the filter portions, e.g. in a microstrip or stripline transmission line section. It may be easier to combine multiple channels in this manner.

As an alternative, it may be preferable to develop single filter that removes or blocks energy at the unwanted frequencies, but passes energy at the particular source frequency of interest. An arrangement that contains a number of variable tuning stubs or adjustable posts set up inside a waveguide cavity that could be adjusted to remove or reject energy at the unwanted frequencies could be implemented to replace the co-axial arrangement. The waveguide cavity could be rectangular or circular in shape, with an aperture such that the long wall or the diameter is approximately a half a wavelength at the lowest frequency that is required to propagate in the guide and deliver energy into tissue at. For example, this frequency could be 433 MHz or 915 MHz, where the half wavelength and thus aperture size is 0.346 m (34.6 cm) and 0.164 m (16.4 cm) respectively.

The electrosurgical generator may be configured to deliver other energy modalities in addition to the plurality of microwave frequencies. For example, the electrosurgical generator may also deliver radiofrequency (RF) energy and/or high voltage pulsed DC energy suitable for electroporation. The output port may thus be connected to the probe via a waveguide isolator that is arranged in a combiner module for combining RF energy with the microwave energy.

The signal combiner itself may be an independent aspect of the invention. According to this aspect, there is provided a microwave signal combiner for an electrosurgical generator having a plurality of microwave channels each arranged to convey microwave energy at a different frequency, the signal combiner comprising: a band stop filter module for connection at a distal end of each of the plurality of microwave channels, wherein the band stop filter module for each microwave channel is configured to block microwave energy at the frequency conveyed on the other microwave channels; and a common signal pathway extending to an output port from a junction at which the plurality of microwave channels are connected. Any features of the signal combiner discussed above with reference to the electrosurgical generator may also apply to this aspect of the invention.

For examples, the signal combiner may be configured for an electrosurgical generator having three or more microwave channels. In this arrangement, the signal combiner may comprise three or more band stop filter modules, each band stop filter module configured to block microwave energy at two or more different frequencies.

Each band stop filter module may comprise a three stub filter for each frequency of microwave energy to be blocked, wherein the three stub filter comprises three stubs connected to a trunk transmission line to present an open circuit in shunt to the junction at a wavelength of the microwave energy to be blocked The electrosurgical generator discussed above may be connected to a probe, e.g. via a coaxial transmission line extending from the output port. The probe may comprise an electrosurgical instrument suitable for insertion through an instrument channel in a surgical scoping device. The electrosurgical instrument may have a distal end assembly configured to output any of the RF, microwave and electroporation energy discussed herein. In one example, the distal end assembly may include a coaxial structure in which an inner conductor protrudes beyond a distal end of an outer conductor and exposed at the distal end of the probe. With this configuration, the distal end assembly formed a bipolar energy delivery structure for delivering RF energy and a microwave antenna for radiating microwave energy.

In this specification "microwave" may be used broadly to indicate a frequency range of 400 MHz to 100 GHz, but preferably the range 400 MHz to 60 GHz. Specific frequencies that have been considered are: 433 MHz, 915 MHz, 2.45 GHz, 3.3 GHz, 5.8 GHz, 10 GHz, 14.5 GHz, 24 GHz and 60 GHz. The device may delivery energy at more than one of these microwave frequencies. The term "radiofrequency" or "RF" may be used to indicate a frequency between 300 kHz and 400 MHz.

Herein, the term "inner" means radially closer to the centre (e.g. axis) of the instrument channel. The term "outer" means radially further from the centre (axis) of the instrument channel.

The term "conductive" is used herein to mean electrically conductive, unless the context dictates otherwise.

Herein, the terms "proximal" and "distal" refer to the ends of the energy conveying structure further from and closer to the treatment site respectively. Thus, in use the proximal end is closer to a generator for providing the microwave energy, whereas the distal end is closer to the treatment site, i.e. the patient.

BRIEF DESCRIPTION OF THE DRAWINGS

Embodiments of the invention are described in detail below with reference to the accompanying drawings, in which.

DETAILED DESCRIPTION; FURTHER OPTIONS AND PREFERENCES

Background

Figure 1:
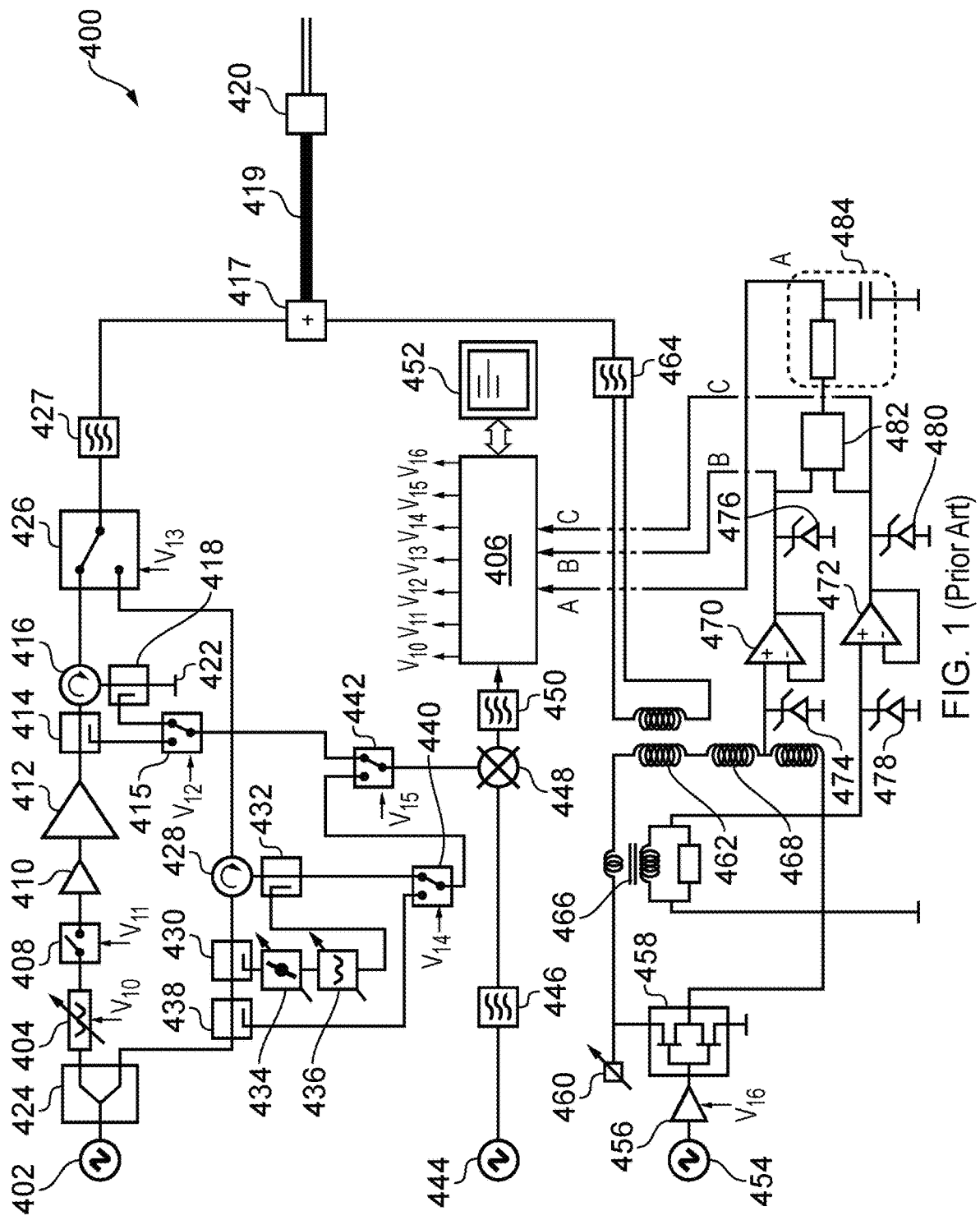
FIG. 1 is a schematic diagram of a known type of electrosurgical generator to which the present invention may be applied.

FIG. 1 shows a schematic diagram of an electrosurgical apparatus 400 such as that disclosed in GB 2 486 343 that is useful for understanding the invention. The apparatus comprises a RF channel and a microwave channel. The RF channel contains components for generating and controlling an RF frequency electromagnetic signal at a power level suitable for treating (e.g. cutting or desiccating) biological tissue. The microwave channel contains components for generating and controlling a microwave frequency electromagnetic signal at a power level suitable for treating (e.g. coagulating or ablating) biological tissue.

The microwave channel has a microwave frequency source 402 followed by a power splitter 424 (e.g. a 3 dB power splitter), which divides the signal from the source 402 into two branches. One branch from the power splitter 424 forms a microwave channel, which has a power control module comprising a variable attenuator 404 controlled by controller 406 via control signal $V_{10}$ and a signal modulator 408 controlled by controller 406 via control signal $V_{11}$, and an amplifier module comprising drive amplifier 410 and power amplifier 412 for generating forward microwave EM radiation for delivery from a probe 420 at a power level suitable for treatment. After the amplifier module, the microwave channel continues with a microwave signal coupling module (which forms part of a microwave signal detector) comprising a circulator 416 connected to deliver microwave EM energy from the source to the probe along a path between its first and second ports, a forward coupler 414 at the first port of the circulator 416, and a reflected coupler 418 at the third port of the circulator 416. After passing through the reflected coupler, the microwave EM energy from the third port is absorbed in a power dump load 422. The microwave signal coupling module also includes a switch 415 operated by the controller 406 via control signal $V_{12}$ for connecting either the forward coupled signal or the reflected coupled signal to a heterodyne receiver for detection.

The other branch from the power splitter 424 forms a measurement channel. The measurement channel bypasses the amplifying line-up on the microwave channel, and hence is arranged to deliver a low power signal from the probe. A primary channel selection switch 426 controlled by the controller 406 via control signal $V_{13}$ is operable to select a signal from either the microwave channel or the measurement channel to deliver to the probe. A high band pass filter 427 is connected between the primary channel selection switch 426 and the probe 420 to protect the microwave signal generator from low frequency RF signals.

The measurement channel includes components arranged to detect the phase and magnitude of power reflected from the probe, which may yield information about the material e.g. biological tissue present at the distal end of the probe. The measurement channel comprises a circulator 428 connected to deliver microwave EM energy from the source 402 to the probe along a path between its first and second ports. A reflected signal returned from the probe is directed into the third port of the circulator 428. The circulator 428 is used to provide isolation between the forward signal and the reflected signal to facilitate accurate measurement. However, as the circulator does not provide complete isolation between its first and third ports, i.e. some of the forward signal may break through to the third port and interfere with the reflected signal, a carrier cancellation circuit may be used that injects a portion of the forward signal (from forward coupler 430) back into the signal coming out of the third port (via injection coupler 432). The carrier cancellation circuit include a phase adjustor 434 to ensure that the injected portion is 180° out of phase with any signal that breaks through into the third port from the first port in order to cancel it out. The carrier cancellation circuit also include a signal attenuator 436 to ensure that the magnitude of the injected portion is the same as any breakthrough signal.

To compensate for any drift in the forward signal, a forward coupler 438 is provided on the measurement channel. The coupled output of the forward coupler 438 and the reflected signal from the third port of the circulator 428 are connected to respective input terminal of a switch 440, which is operated by the controller 406 via control signal $V_{14}$ to connect either the coupled forward signal or the reflected signal to a heterodyne receiver for detection.

The output of the switch 440 (i.e. the output from the measurement channel) and the output of the switch 415 (i.e. the output from the microwave channel) are connect to a respective input terminal of a secondary channel selection switch 442, which is operable by the controller 406 via control signal $V_{15}$ in conjunction with the primary channel selection switch to ensure that the output of the measurement channel is connected to the heterodyne receiver when the measurement channel is supplying energy to the probe and that the output of the microwave channel is connected to the heterodyne receiver when the microwave channel is supplying energy to the probe.

The heterodyne receiver is used to extract the phase and magnitude information from the signal output by the secondary channel selection switch 442. A single heterodyne receiver is shown in this system, but a double heterodyne receiver (containing two local oscillators and mixers) to mix the source frequency down twice before the signal enters the controller may be used if necessary. The heterodyne receiver comprises a local oscillator 444 and a mixer 448 for mixing down the signal output by the secondary channel selection switch 442. The frequency of the local oscillator signal is selected so that the output from the mixer 448 is at an intermediate frequency suitable to be received in the controller 406. Band pass filters 446, 450 are provided to protect the local oscillator 444 and the controller 406 from the high frequency microwave signals.

The controller 406 receives the output of the heterodyne receiver and determines (e.g. extracts) from it information indicative of phase and magnitude of the forward and/or reflected signals on the microwave or measurement channel. This information can be used to control the delivery of high power microwave EM radiation on the microwave channel or high power RF EM radiation on the RF channel. A user may interact with the controller 406 via a user interface 452, as discussed above.

The RF channel shown in FIG. 1 comprises an RF frequency source 454 connected to a gate driver 456 that is controlled by the controller 406 via control signal $V_{16}$. The gate driver 456 supplies an operation signal for an RF amplifier 458, which is a half-bridge arrangement. The drain voltage of the half-bridge arrangement is controllable via a variable DC supply 460. An output transformer 462 transfers the generated RF signal on to a line for delivery to the probe 420. A low pass, band pass, band stop or notch filter 464 is connected on that line to protect the RF signal generator from high frequency microwave signals.

A current transformer 466 is connected on the RF channel to measure the current delivered to the tissue load. A potential divider 468 (which may be tapped off the output transformer) is used to measure the voltage. The output signals from the potential divider 468 and current transformer 466 (i.e. voltage outputs indicative of voltage and current) are connected directly to the controller 406 after conditioning by respective buffer amplifiers 470, 472 and voltage clamping Zener diodes 474, 476, 478, 480 (shown as signals B and C in FIG. 1).

To derive phase information, the voltage and current signals (B and C) are also connected to a phase comparator 482 (e.g. an EXOR gate) whose output voltage is integrated by RC circuit 484 to produce a voltage output (shown as A in FIG. 1) that is proportional to the phase difference between the voltage and current waveforms. This voltage output (signal A) is connected directly to the controller 406.

The microwave/measurement channel and RF channel are connected to a signal combiner 114, which conveys both types of signal separately or simultaneously along cable assembly 116 to the probe 420, from which it is delivered (e.g. radiated) into the biological tissue of a patient.

A waveguide isolator (not shown) may be provided at the junction between the microwave channel and signal combiner. The waveguide isolator may be configured to perform three functions: (i) permit the passage of very high microwave power (e.g. greater than 10 W); (ii) block the passage of RF power; and (iii) provide a high withstanding voltage (e.g. greater than 10 kV). A capacitive structure (also known as a DC break) may also be provided at (e.g. within) or adjacent the waveguide isolator. The purpose of the capacitive structure is to reduce capacitive coupling across the isolation barrier.

Figure 2:
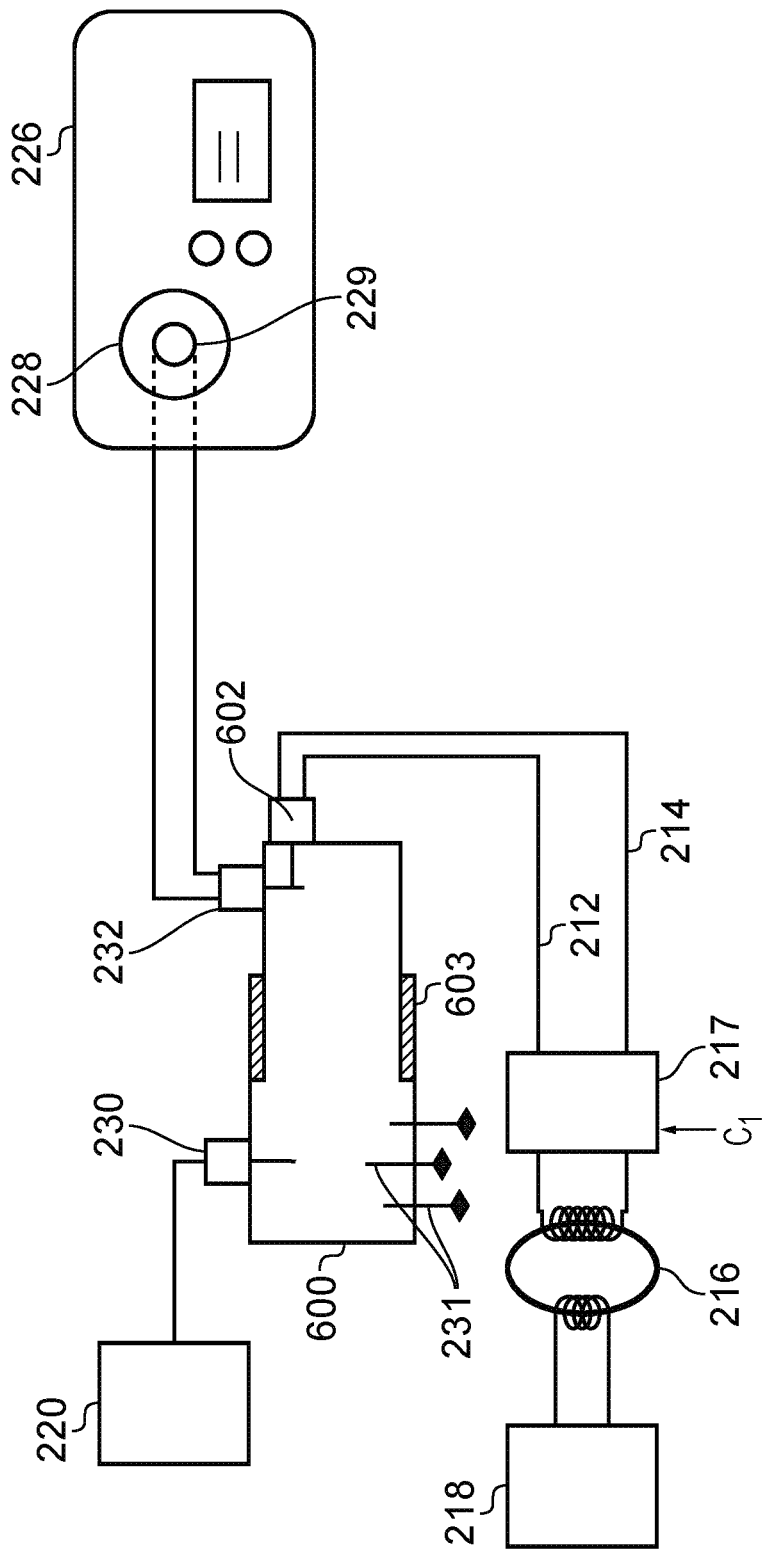
FIG. 2 is a schematic diagram of an isolating circuit that can be used in an electrosurgical generator of FIG. 1.

FIG. 2 is a schematic diagram of an isolating circuit as disclosed GB 2 522 533, which is also useful for understanding the invention. The isolating circuit forms part of a feed structure for conveying RF EM radiation from an RF signal generator 218 and microwave radiation from a microwave signal generator 220 to a probe. The probe (not shown) is connectable to an output port 228 provided in a housing 226. An insulating sleeve 229 is provided at the output port 228 of the housing to prevent a current path for connecting the grounded casing of the housing with the floating components connected to the output port 228.

The feed structure comprises an RF channel having a RF signal pathway 212, 214 for conveying the RF EM radiation and a microwave channel having a microwave signal pathway 210 for conveying the microwave EM radiation. The signal pathways for the RF EM radiation and microwave radiation are physically separate from each other. The RF signal generator is connected to the RF signal pathway 212, 214 via a voltage transformer 216. The secondary coil of the transformer 216 (i.e. on the probe side of the arrangement) is floating, so there is not direct current path between the patient and the RF signal generator 218. This means that both the signal conductor 212 and ground conductor 214 of the RF signal pathway 212, 214 are floating.

The isolating circuit comprises a waveguide isolator 600 whose insulating gap is configured to provide the necessary level of DC isolation whilst also having a capacitive reactance that is low enough at the frequency of the microwave energy to prevent leakage of the microwave energy at the gap. The gap may be 0.6 mm or more, e.g. 0.75 mm. RF energy is not able to couple between the two ends of the isolator because the diameter of the tube creates a very large inductance in series with each of the probes at the RF frequency.

The isolating circuit has a combining circuit integrated with the waveguide isolator 600. A signal conductor 212 and ground conductor 214 carrying the RF signal are connected to a coaxial RF connector 602 (RF feed), which introduces the RF signal into the waveguide isolator 600, from where it is conveyed out from an output port 232 towards the probe.

The isolating gap 603 is arranged to prevent the RF signal from coupling back into the input port 230. Microwave energy is prevented from coupling into the RF connector 602 by careful placement of the inner conductive rod within the waveguide isolator.

A tuning unit is incorporated into the waveguide isolator 600 in order to reduce the return loss of the line up of components. The tuning unit comprises three stubs 231 that can be adjustably inserted, e.g. screwed, into the body of the cavity.

In addition, the RF channel has an adjustable reactance 217 that is operable under the control of control signal $C_1$ to accommodate (e.g. compensate for) changes in capacitance arising from different lengths of cable used with the generator. The adjustable reactance 217 may comprise one or more of switched or electronically tunable capacitors or inductors connected in shunt or series with the RF channel.

Selective Delivery of Multiple Microwave Frequencies

Figure 3:
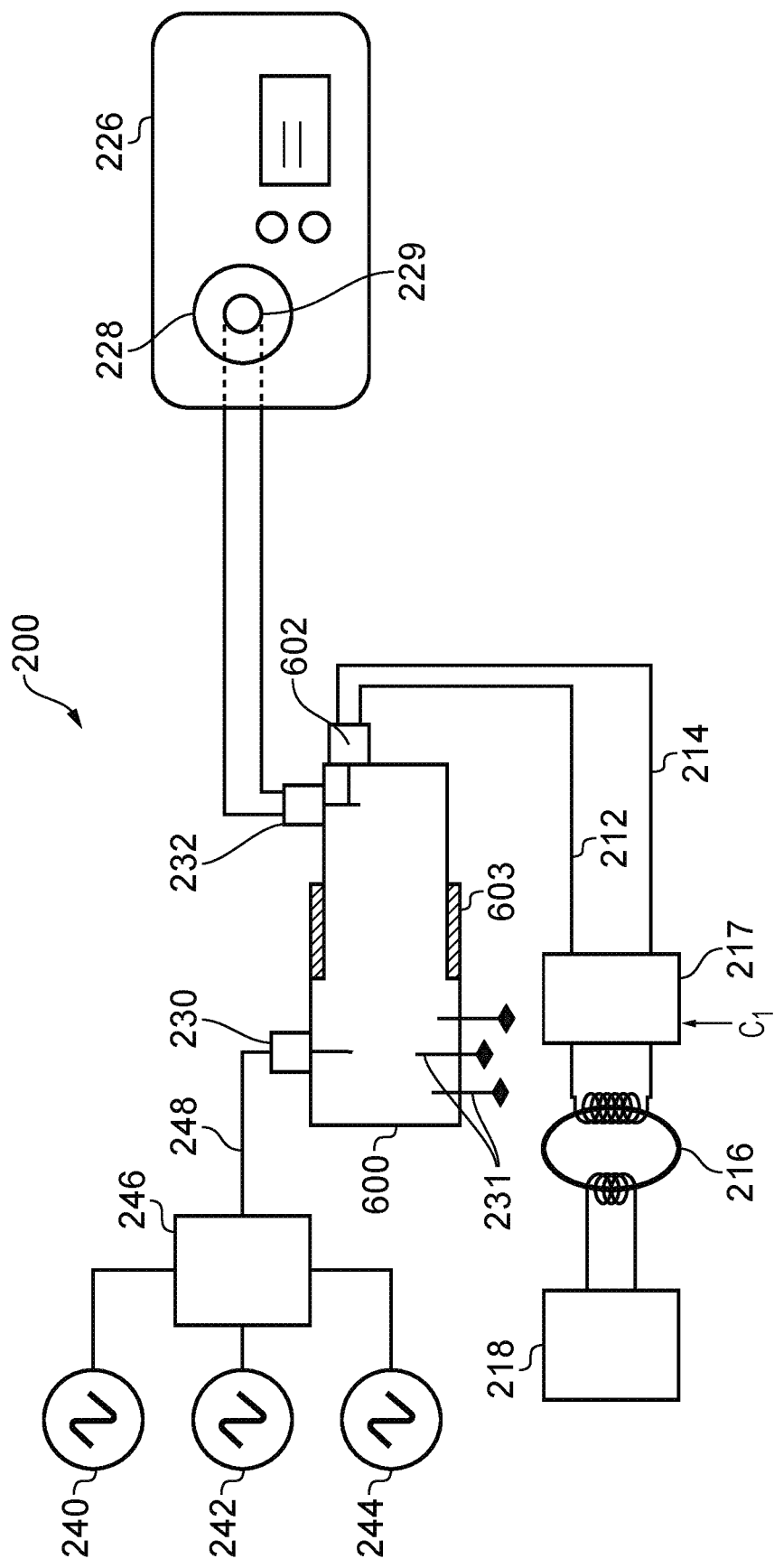
FIG. 3 is a schematic diagram of an electrosurgical generator capable of delivering microwave energy at multiple frequencies that is an embodiment of the invention.

FIG. 3 is a schematic diagram of an electrosurgical generator 200 that is an embodiment of the invention. The overall architecture of the electrosurgical generator may similar to that discussed above with respect to FIG. 1, and it may include an isolating circuit as discussed with respect to FIG. 2 to combined RF and microwave energy.

However, the electrosurgical generator 200 of the invention differs from FIGS. 1 and 2 in that it comprises a plurality of microwave channels 240, 242, 244, each configured to generate microwave energy having a particular frequency different from the other microwave channels. The plurality of microwave channels 240, 242, 244 may each comprise a separate (independent) microwave source. Alternatively, the signals on each microwave channel may be derived from a single source, with suitable frequency multiplication or division. Each microwave channel may be configured as the microwave channel discussed above with respect to FIG. 1.

Each of the plurality of microwave channels may be operable (e.g. activatable) independently. Microwave signals having differing frequencies can be thus be supplied separately or simultaneously from the plurality of microwave channels.

The electrosurgical generator 200 further comprises a microwave signal combiner 246 having a set of input ports configured to receive a microwave signal from each of the plurality of microwave channels 240, 242, 244. The microwave signal combiner 246 also has an output port from which the signals from the microwave channels 240, 242, 244 are conveyed along a common transmission line 248 to the input port 230 of the waveguide isolator 600.

The plurality of microwave channels 240, 242, 244 may be arranged to generate a microwave signal at any suitable frequency. However, it may be preferred for the generated frequencies to belong to one of the following ISM bands:

433.05 MHz to 434.79 MHz (1.74 MHz bandwidth with a centre frequency 433.92 MHz)

902 MHz to 928 MHz (26 MHz bandwidth with a centre frequency at 915 MHz)

2.4 GHz to 2.5 GHz (100 MHz bandwidth with centre frequency of 2.45 GHz)

5.725 GHz to 5.875 GHz (150 MHz bandwidth with a centre frequency of 5.8 GHz)

24.0 GHz to 24.25 GHz (250 MHz bandwidth with a centre frequency 24.125 MHz)

61.0 GHz to 61.5 GHz (500 MHz bandwidth with a centre frequency 61.25 GHz).

The microwave channels may generate signals from any combination of two or more of the above bands.

Figure 4:
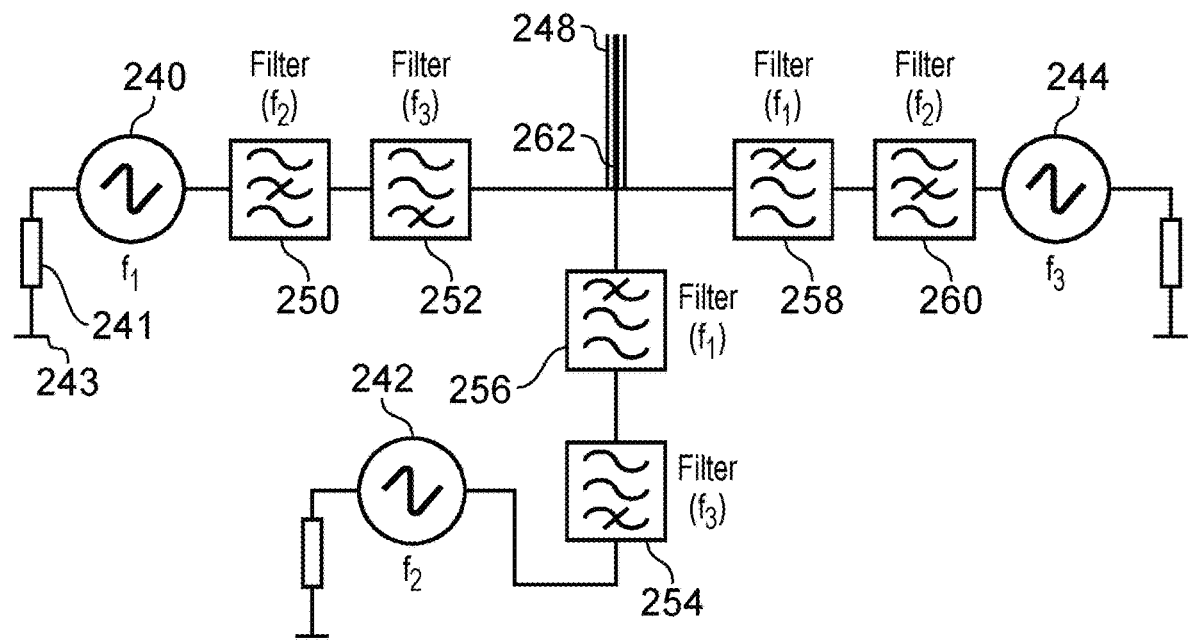
FIG. 4 is a schematic diagram of a signal combiner suitable for use in the electrosurgical generator of FIG. 3.

FIG. 4 is a schematic diagram of a microwave signal combiner suitable for use in the electrosurgical generator of FIG. 3. In this example, there are three microwave channels 240, 242, 244, each connected to a common output transmission line 248 at a junction 262. Each microwave channel may be connected to ground 243 at its proximal end, e.g. through a 50Ω load 241.

The microwave signal combiner comprises a pair of band stop filters at the distal end of each microwave channel, before the junction 262. The band stop filters on a given microwave channel operate to selectively block microwave energy having a frequency corresponding to the other microwave channels from entering that microwave channel.

Thus, a first microwave channel 240 may operate to output a microwave signal having a first frequency $f_1$, a second microwave channel 242 may operate to output a microwave signal having a second frequency $f_2$, and a third microwave channel 244 may operate to output a microwave signal having a third frequency $f_3$.

The first microwave channel 240 may have a first pair of band stop filters 250, 252 at a distal end thereof. The first pair of band stop filters 250, 252 comprise a band stop filter 250 configured to block the second frequency, and a band stop filter 252 configured to block the third frequency.

The second microwave channel 242 may have a second pair of band stop filters 254, 256 at a distal end thereof. The second pair of band stop filters 254, 256 comprise a band stop filter 254 configured to block the third frequency, and a band stop filter 256 configured to block the first frequency.

The third microwave channel 244 may have a third pair of band stop filters 258, 260 at a distal end thereof. The third pair of band stop filters 258, 260 comprise a band stop filter 258 configured to block the first frequency, and a band stop filter 260 configured to block the second frequency.

Each band stop filter may be configured as a two or three stub filter arranged to block passage of microwave energy at a certain frequency, while permitting other frequencies to pass. The signal combiner may thus comprise a network of band stop filters. Each filter may be fabricating used any suitable transmission line structure, e.g. coaxial transmission line, microstrip or stripline, or any other waveguide suitable for supporting microwave propagation. In an advantageous arrangement, the stubs may be formed from the same type of transmission line as that which conveys the microwave signal along the channel. Thus, the stubs may be coaxial transmission line having the same impedance (e.g. 50Ω) as the coaxial transmission line through the microwave channel. Alternatively, the signal combiner may be a separate component, e.g. fabricated as a microstrip or stripline structure, having connectors (e.g. SMA connectors) at a proximal end and a distal end thereof to connect to a coaxial transmission on the microwave channel and common junction respectively.

Each stub is at a distance from the junction designed to result in optimum transmission of the other frequency through the junction to the common junction 262, by presenting a shunt open circuit for that frequency at the position of the junction.

The number of stubs can be selected to provide the level of signal reduction required. Three stubs is normally enough to provide isolation (signal reduction) of 60 dB.

Figure 5:
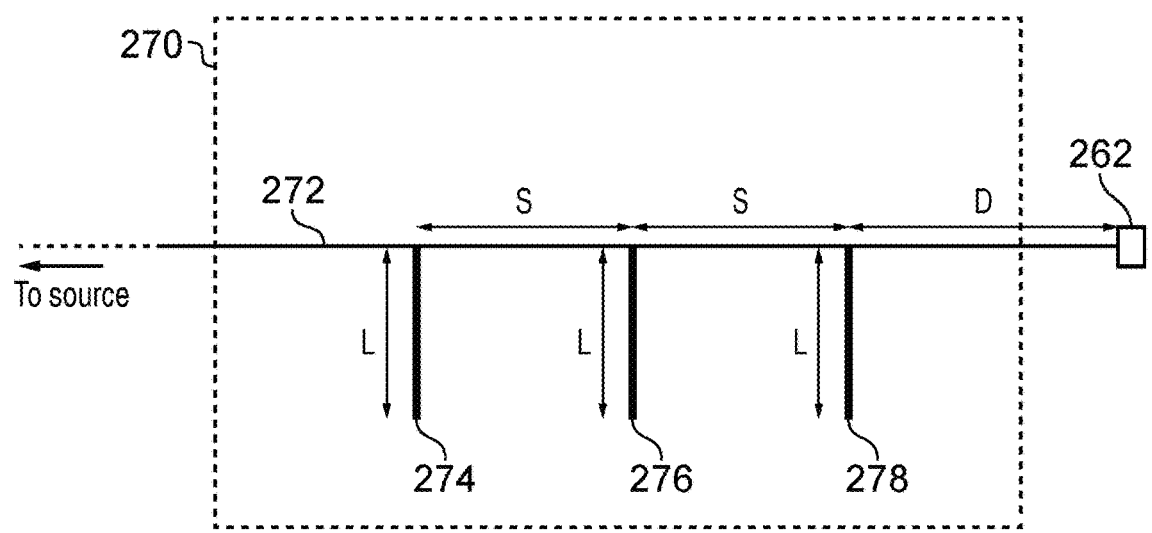
FIG. 5 is a schematic diagram of a band stop filter suitable for use in the signal combiner of FIG. 4.

FIG. 5 is a schematic diagram of a band stop filter 270 suitable for use in the signal combiner of FIG. 4. The band stop filter 270 comprises a trunk transmission line 272 that connects the microwave channel to the junction 262. Three stubs 274, 276, 278 are connected in shunt to the trunk transmission line 272. The end of each stub away from the trunk transmission line 272 is in an open circuit condition.

Each stub has a length L that is an odd quarter wavelength of the microwave energy to be blocked when conveyed by the transmission line from which the stub is fabricated (referred to herein as the guided wavelength). At the microwave energy frequencies discussed herein, each stub may be a single quarter wavelength.

The stubs 274, 276, 278 are spaced from each other along the trunk transmission line 272 by a separation S that is a half wavelength of the guided microwave energy to be blocked.

The first stub 278 is spaced from the junction 262 by a distance D that is an odd quarter wavelength of the guided microwave energy to be blocked. The result of this configuration is that each stub presents an open circuit in shunt at the junction, because the open circuit at the end of each stub is a multiple half wavelength from the junction.

Returning to FIG. 4, it can be understood that each band stop filter can be embodied as a set of stubs configured as discussed above for each wavelength to be blocked.

As discussed above, each stub can be formed from any suitable transmission line. In one example, each stub is formed from a coaxial transmission line, e.g. a coaxial cable, comprising an inner conductor separated from an outer conductor by a dielectric material. It is desirable for each stub to have the same impedance as the trunk transmission line, which may for example by 50Ω. In order to handle microwave energy having a power level suitable for electrosurgery without too much loss, the outer diameter of the outer conductor may preferably be equal to or greater than 10 mm. For a dielectric material having a relative permittivity $\varepsilon_r$ equal to 2.2, one can determine a required size of the inner conductor using the equation $$Z_{stub} = \frac{138}{\sqrt{\varepsilon_r}} \log_{10} \frac{b}{a}$$

where $Z_{stub}$ is the desired impedance, b is the outer diameter of the outer conductor, and a is the outer diameter of the inner conductor. So in the example above, a 50Ω stub would be obtained where the outer diameter a of the inner conductor is 2.9 mm. In such a coaxial transmission line, the guided wavelength $\lambda_g$ is given by the expression $$\lambda_g = \frac{c}{f\sqrt{\varepsilon_r}}$$

where c is the speed of light, f is the frequency of the microwave energy to be blocked, and $\varepsilon_r$ is the relative permittivity of the dielectric material in the coaxial transmission line. Thus, at 5.8 GHz, a quarter wave stub made from the coaxial transmission line defined above would have a length L of 8.7 mm, and the half wavelength spacing S would be 17.4 mm.

Figure 6:
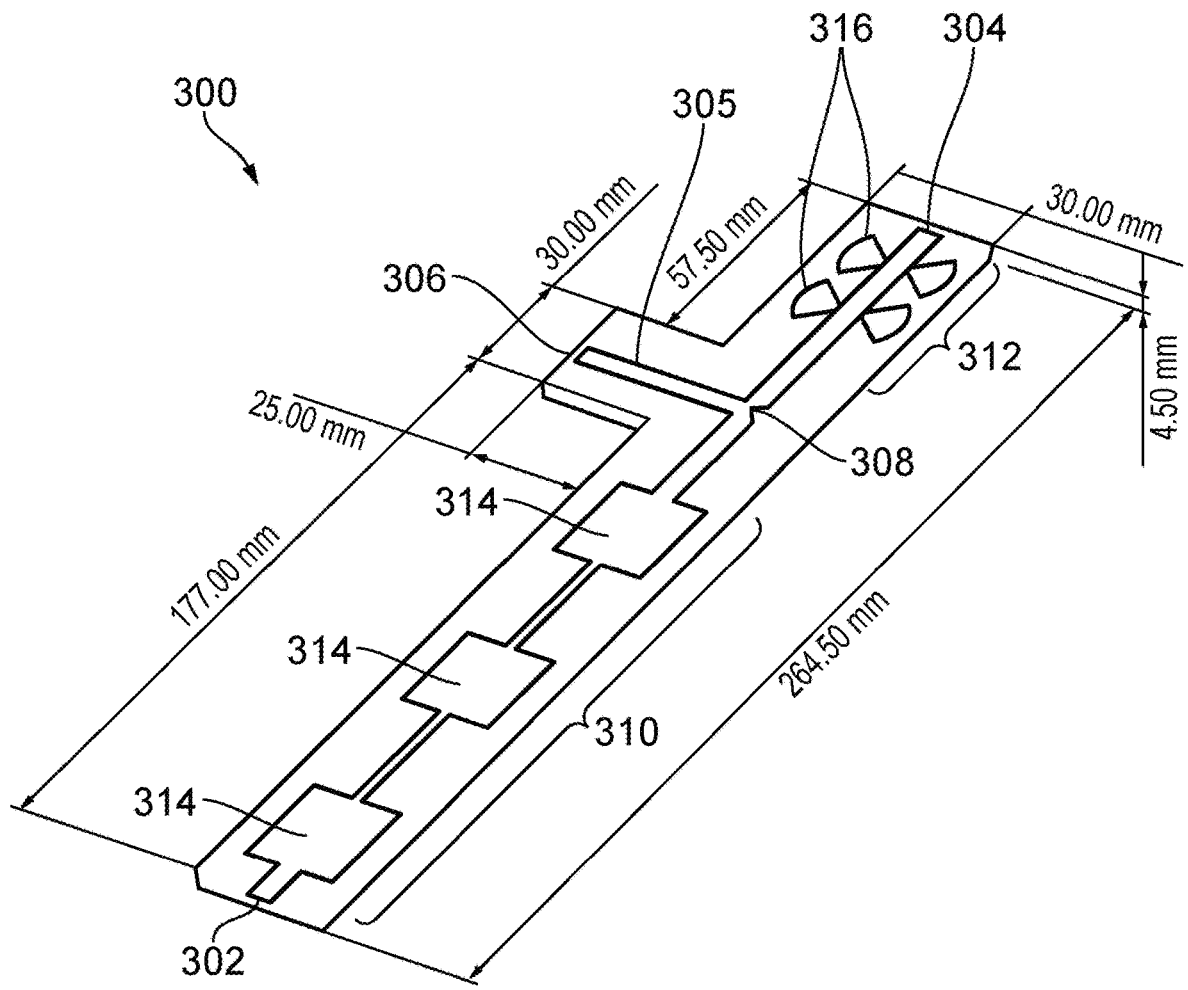
FIG. 6 is a schematic diagram of a stripline-based signal combiner suitable for use in the electrosurgical generator of FIG. 3.

FIG. 6 is a schematic diagram of a stripline-based signal combiner 300 suitable for use in the electrosurgical generator of FIG. 3. The signal combiner 300 is configured as a diplexer, or filter T, for combining 2.45 GHz and 5.8 GHz signals from a pair of separate microwave channels on a common output 306, while isolating each source from the other at their operating frequencies.

The signal combiner 300 is fabricated in air stripline. FIG. 6 shows the shape of the middle conductor in the stripline. Air surrounds the stripline, and there are layers of a grounded conductor (not shown), formed from aluminium or the like, above and below the middle conductor and at the walls of the combiner to enclose it. The signal combiner comprises a first port 302 for receiving microwave energy at a frequency of 5.8 GHz. The first port 302 is connected to a junction 308 by a first arm 310 that has three stub filters 314 formed thereon. The signal combiner 300 further comprises a second port 304 for receiving microwave energy at a frequency of 2.45 GHz. The second port 304 is connected to the junction 308 by a second arm 312 that has two fan-type stub filters 316 formed thereon. The junction 308 is connected to a third (output) port 306 by a common arm 305.

The first port 302 and the second port 304 may each have an SMA connector (not shown) fitted thereto for connecting to a coaxial cable that conveying the relevant microwave energy.

The distance between the junction 308 and the first stub on each of the first arm 310 and the second arm 312 is set to be an odd number of quarter wavelengths of the microwave energy conveyed by the opposite arm, as discussed above. The separation between the stubs and their length away from the conductor that separates them is also set as discussed above. There are only two fan-type stub filters on the second arm 312 because they provide the level of isolation required.

Figure 7:
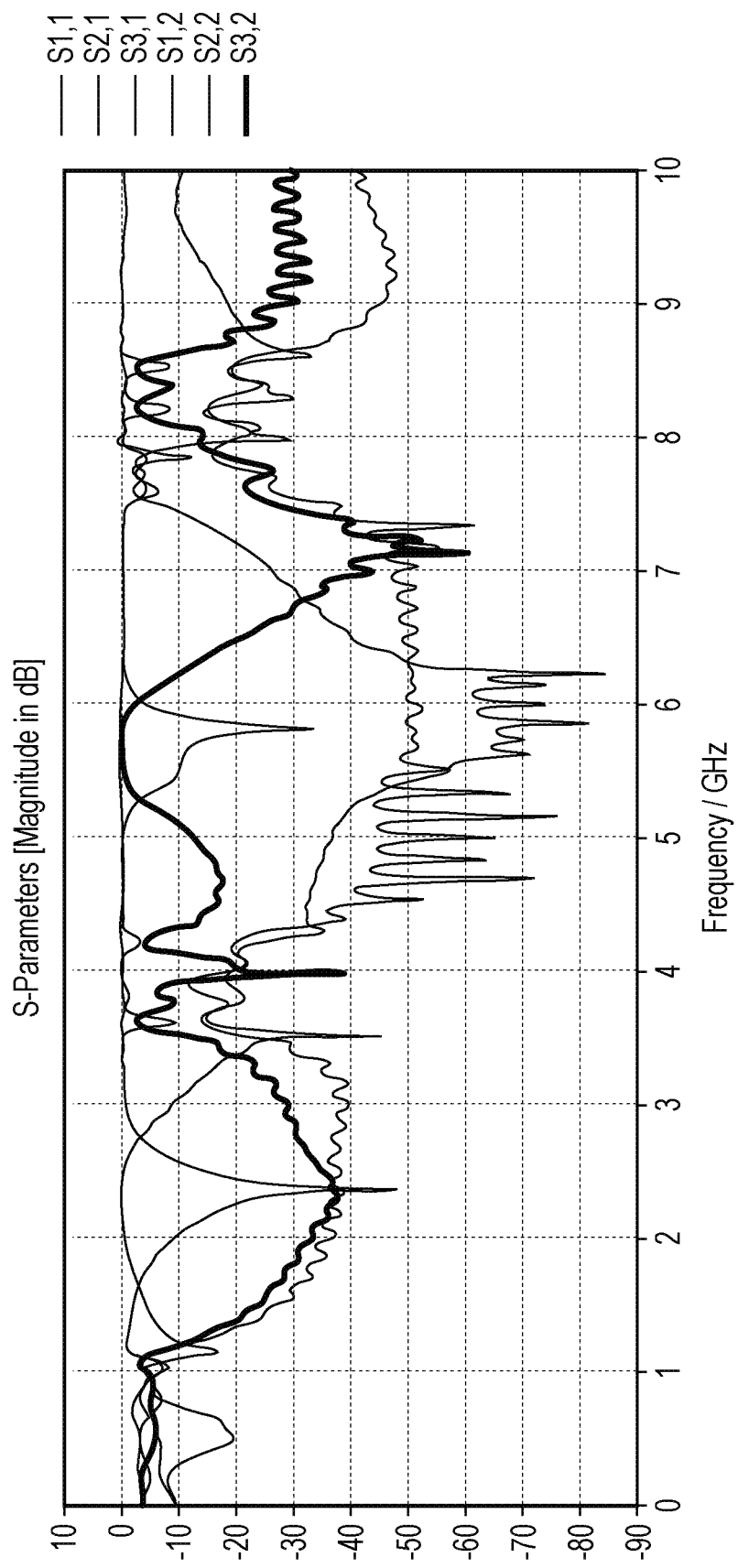
FIG. 7 is a simulated graph showing a signal response between the output port and first input port of the signal combiner shown in FIG. 6.

FIG. 7 is a simulated graph (obtained from a simulation of the structure shown in FIG. 6 performed in CST Microwave Studio®), showing a signal response between the output port 306 and the first input port 302 of the signal combiner 300 shown in FIG. 6. The graph shows low loss at 5.8 GHz, but attenuates a 2.45 GHz signal by −35 dB or more. This means that 5.8 GHz passes well on this route, but 2.45 GHz is strongly isolated.

Figure 8:
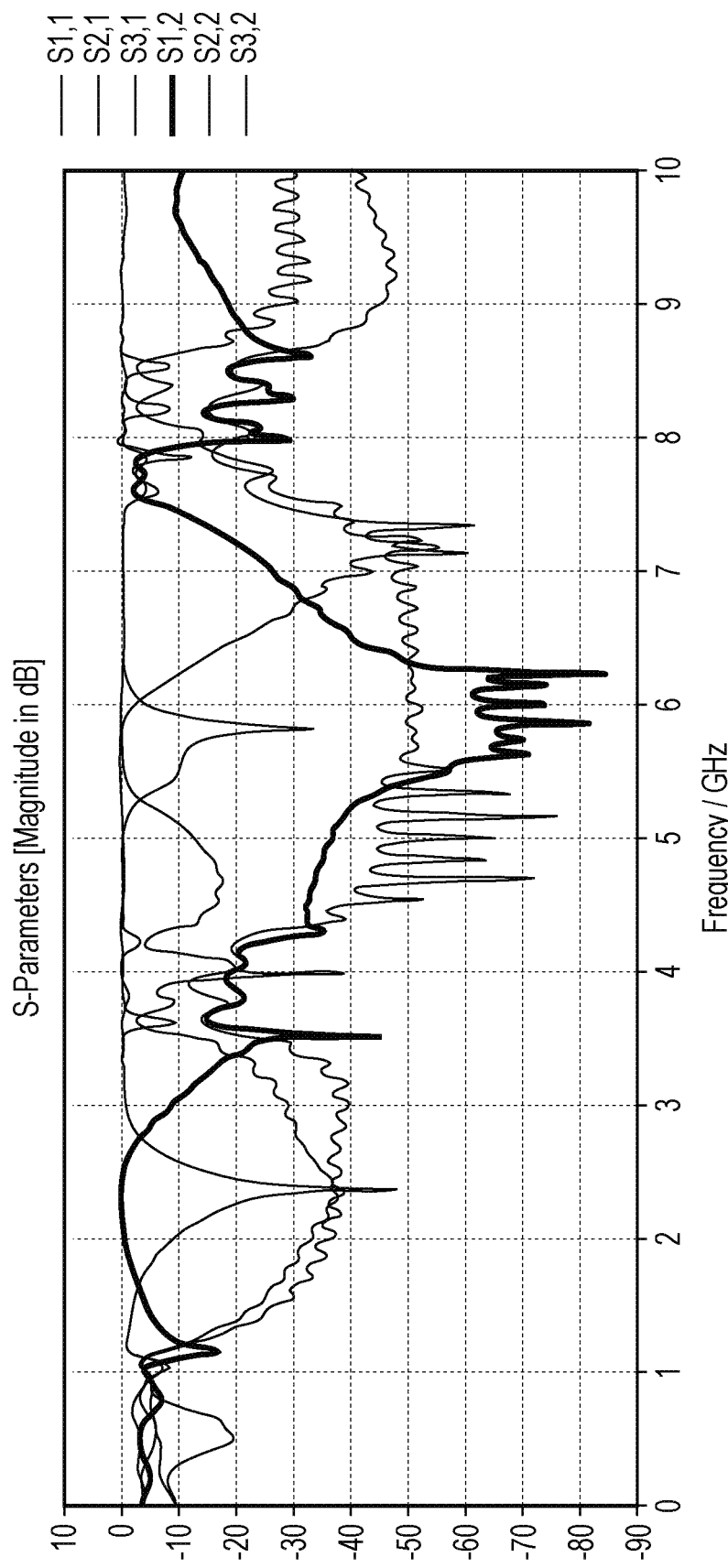
FIG. 8 is a simulated graph showing a signal response between the output port and second input port of the signal combiner shown in FIG. 6.

FIG. 8 is a simulated graph showing a signal response between the output port 306 and second input port 304 of the signal combiner shown in FIG. 6. The graph shows low loss at 2.45 GHz, but attenuates a 5.8 GHz signal by −35 dB or more. This means that 2.45 GHz passes well on this route, but 5.8 GHz is strongly isolated.

Figure 9:
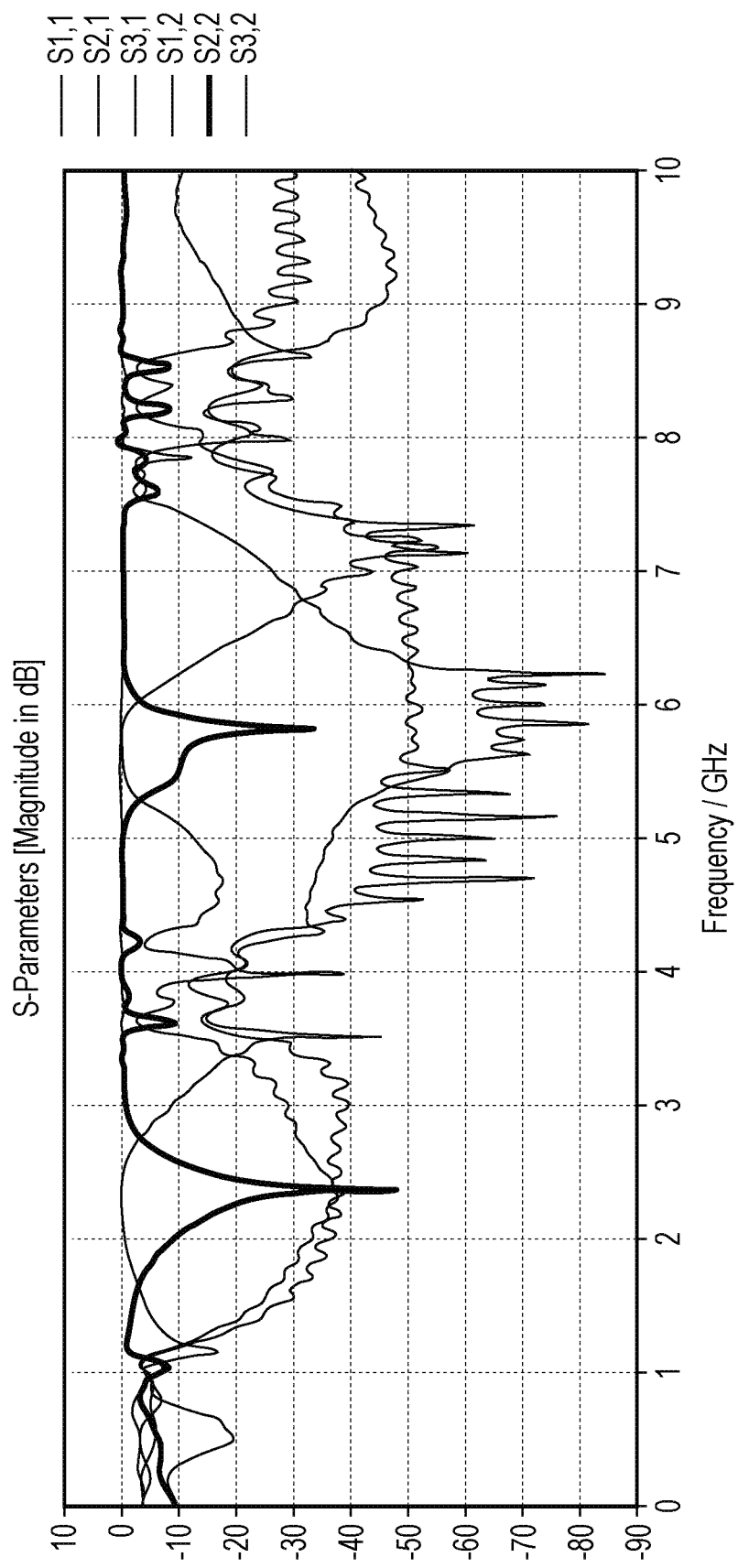
FIG. 9 is a simulated graph showing a matched signal response at the output port of the signal combiner shown in FIG. 6.

FIG. 9 is a simulated graph showing a matched signal response at the output port 306 of the signal combiner 300 shown in FIG. 6. These graph shows that both 2.45 GHz and 5.8 GHz are well matched at the output port.

Figure 10:
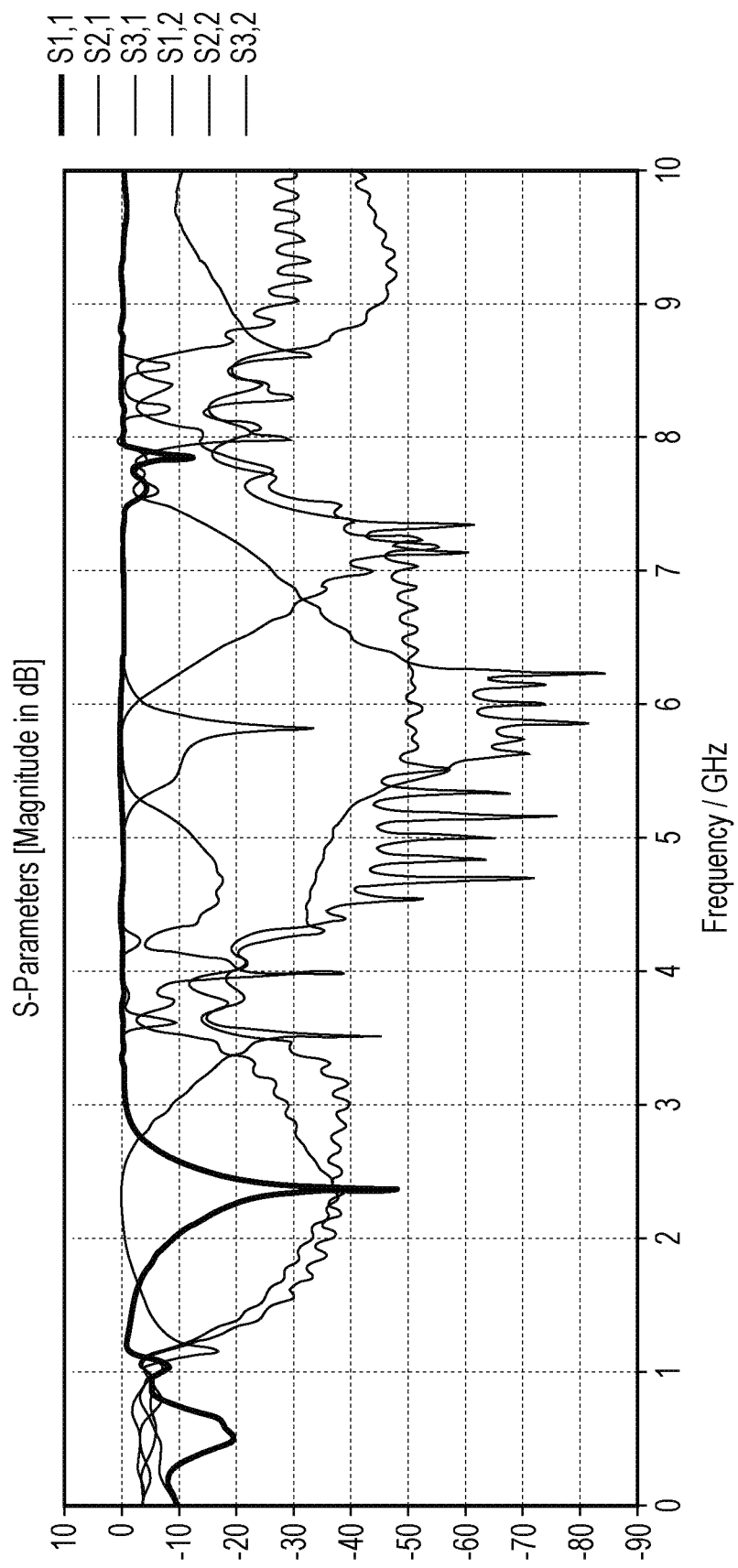
FIG. 10 is a simulated graph showing a matched signal response at the first input port of the signal combiner shown in FIG. 6.

FIG. 10 is a simulated graph showing a matched signal response at the second input port 304 of the signal combiner shown in FIG. 6. The signal is well matched at 2.45 GHz.

Figure 11:
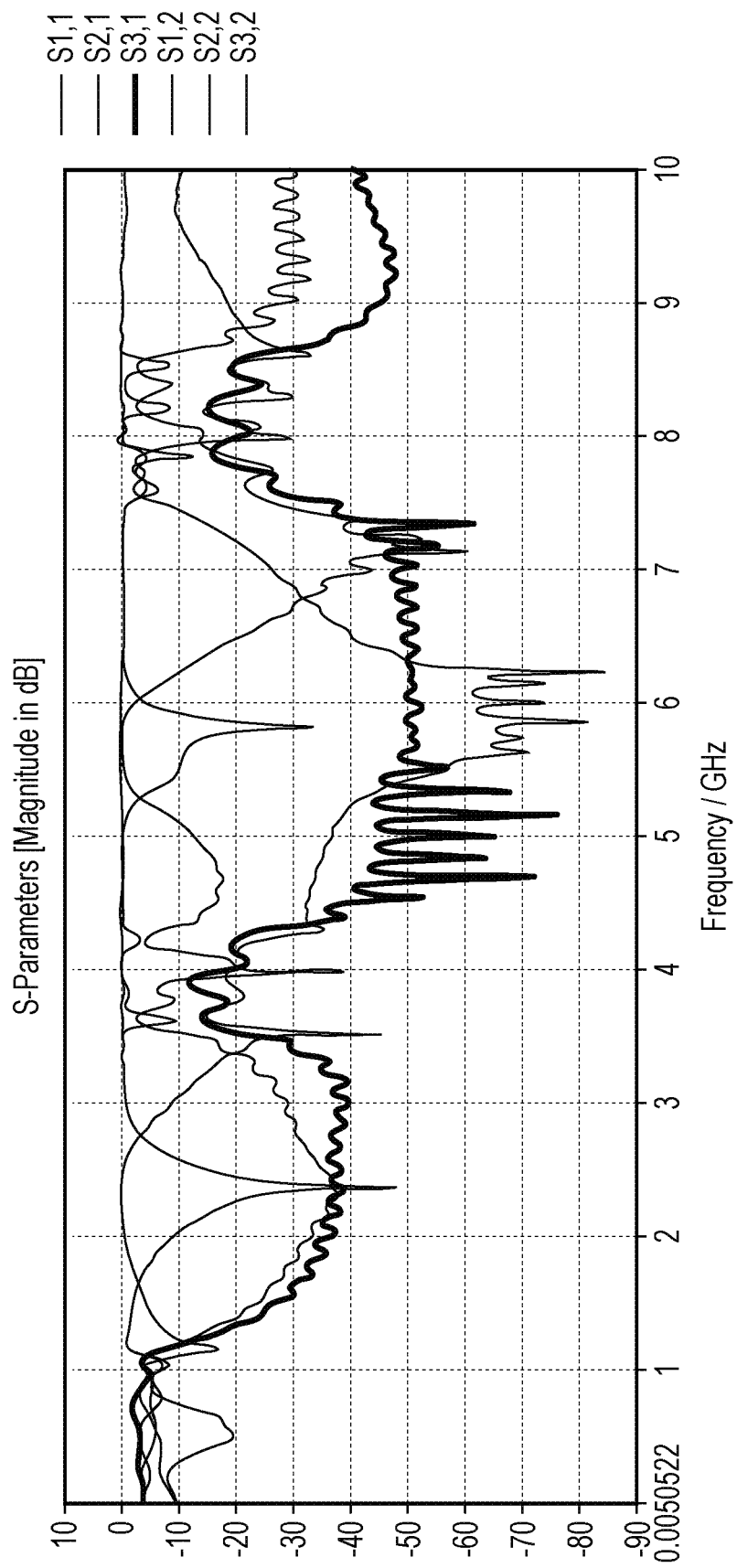
FIG. 11 is a simulated graph showing a signal response between the first input port and the second input port of the signal combiner shown in FIG. 6.

FIG. 11 is a simulated graph showing a signal response between the first input port 302 and the second input port 304 of the signal combiner shown in FIG. 6. It can be seen that both 2.45 GHz and 5.8 GHz are strongly blocked on this route.

The invention claimed is:

1. An electrosurgical generator comprising:
   an electromagnetic signal supply unit for generating microwave energy to be conveyed on each of three or more microwave channels, wherein each of the three or more microwave channels is arranged to convey microwave energy at a different frequency;
   an output port configured to be connectable to a probe for delivering microwave energy from the three or more microwave channels; and
   a signal combiner configured to connect the three or more microwave channels to the output port,
   wherein the signal combiner comprises:
      a band stop filter module disposed at a distal end of each of the three or more microwave channels, wherein the band stop filter module for each microwave channel is configured to block microwave energy at the frequency conveyed on each of the other microwave channels; and
      a common signal pathway extending between the output port and a junction at which the three or more microwave channels are connected,
   wherein each microwave channel comprises a trunk transmission line along which microwave energy having the frequency corresponding to the microwave channel is conveyed from the electromagnetic signal supply unit to the junction;
   wherein each band stop filter module comprises a three stub filter for each frequency of microwave energy to be blocked, wherein the three stub filter comprises three stubs connected to the trunk transmission line to present an open circuit in shunt to the junction at a wavelength of the microwave energy to be blocked.

2. The electrosurgical generator of claim 1, wherein the electromagnetic signal supply unit comprises a plurality of microwave sources each configured to output microwave energy at one of the frequencies conveyed by the three or more microwave channels.

3. The electrosurgical generator of claim 1, wherein the three or more microwave channels are configured to output microwave energy having any combination of two or more of 433 MHZ, 915 MHz, 2.45 GHz, 5.8 GHz, 14.5 GHZ, 24 GHz, and 60 GHz.

4. The electrosurgical generator of claim 1, wherein the electrosurgical generator comprises a radiofrequency (RF) source for generating RF energy to be delivered along an RF channel to the output port.

5. The electrosurgical generator of claim 1, wherein the electrosurgical generator is configured to deliver high voltage pulsed DC energy to the output port.

6. The electrosurgical generator of claim 1, wherein each of the three stubs has a length equal to a quarter wavelength of the microwave energy to be blocked, wherein the three stubs are separated along the trunk transmission line by half a wavelength of the microwave energy to be blocked, and wherein a first stub is spaced from the junction by a distance equal to an odd number of quarter wavelengths of the microwave energy to be blocked.

7. The electrosurgical generator of claim 6, wherein the three stubs are formed from lengths of coaxial transmission line.

8. The electrosurgical generator of claim 6, wherein the three stubs are formed from lengths of microstrip transmission line.

9. The electrosurgical generator of claim 6, wherein the three stubs are formed from lengths of waveguide.

10. The electrosurgical generator of claim 6, wherein one or more of the band stop filter modules is configured as a stripline component.

11. The electrosurgical generator of claim 1, wherein each trunk transmission line for each microwave channel comprises:

a coaxial transmission line portion extending from the electromagnetic signal supply unit to the band stop filter module, and a filter portion extending through the band stop filter module, wherein the band stop filter module has an SMA connector for connecting the coaxial transmission line portion to the filter portion.

12. The electrosurgical generator of claim 1, wherein the output port is connected to the probe via a waveguide isolator that is arranged in a combiner module for combining radiofrequency (RF) energy with the microwave energy.

13. A microwave signal combiner for an electrosurgical generator having three or more microwave channels each arranged to convey microwave energy at a different frequency, the signal combiner comprising:

a band stop filter module for connection at a distal end of each of the three or more microwave channels, wherein the band stop filter module for each microwave channel is configured to block microwave energy at two or more different frequencies conveyed on the other microwave channels; and a common signal pathway extending to an output port from a junction at which the three or more microwave channels are connected, wherein each band stop filter module comprises a three stub filter for each frequency of microwave energy to be blocked, wherein the three stub filter comprises three stubs connected to a trunk transmission line to present an open circuit in shunt to the junction at a wavelength of the microwave energy to be blocked.

* * * * *